United States Patent [19]

Moran

[11] 4,342,475
[45] Aug. 3, 1982

[54] CONNECTOR AND ADAPTER FOR DUCT SYSTEMS FOR TELEPHONE CABLES AND THE LIKE

[75] Inventor: Thomas F. Moran, Aurora, Ohio

[73] Assignee: Midwest Plastic Fabricators, Inc., Chagrin Falls, Ohio

[21] Appl. No.: 136,914

[22] Filed: Apr. 3, 1980

[51] Int. Cl.³ .............................................. F16L 39/00
[52] U.S. Cl. .............................. 285/137 R; 174/71 R; 285/197; 285/423; 285/DIG. 16
[58] Field of Search .................... 285/131, 137 R, 197, 285/DIG. 16, 423, 287; 138/111, 115; 174/71 R, 72 R, 95, 97

[56] References Cited

U.S. PATENT DOCUMENTS

| | | | |
|---|---|---|---|
| 1,781,726 | 11/1930 | Jewell | 138/115 |
| 1,785,403 | 12/1930 | Bubb | 138/115 |
| 1,798,205 | 3/1931 | Jewell | 285/137 R |
| 1,835,245 | 12/1931 | Shipley | 138/111 |
| 1,908,821 | 5/1933 | Cornell | 285/287 X |
| 1,946,237 | 2/1934 | Robertson | 285/197 |
| 3,188,121 | 6/1965 | Cude et al. | 285/423 X |
| 3,649,055 | 3/1972 | Nilsen | 285/197 |
| 3,870,348 | 3/1975 | Hawkins | 285/197 |
| 4,002,358 | 1/1977 | Streit | 285/137 R |
| 4,052,953 | 10/1977 | Patel | 285/197 |

FOREIGN PATENT DOCUMENTS

| | | | |
|---|---|---|---|
| 968700 | 5/1950 | France | 285/197 |
| 104974 | 8/1964 | Norway | 285/197 |

Primary Examiner—Dave W. Arola
Attorney, Agent, or Firm—Pearne, Gordon, Sessions, McCoy & Granger

[57] ABSTRACT

A duct system is disclosed for telephone cables and other cables and conductors. The duct system includes a conduit having multiple bores each adapted to contain a cable, and a hollow, tubular duct branching from the conduit and adapted to contain a single cable or group of cables. The duct system also includes a connection adapted at one end to be attached to the conduit and to communicate with one of the bores of the conduit and adapted at the other end to be attached to the end of the tubular duct. The connection provides an easily and economically installed means for connecting single bore tubular ducts to multiple bore conduits which maintains the integrity of the duct system, may be formed of a long-life plastic material, and which provides a smooth interior surface for the pulling of cables therethrough.

15 Claims, 5 Drawing Figures

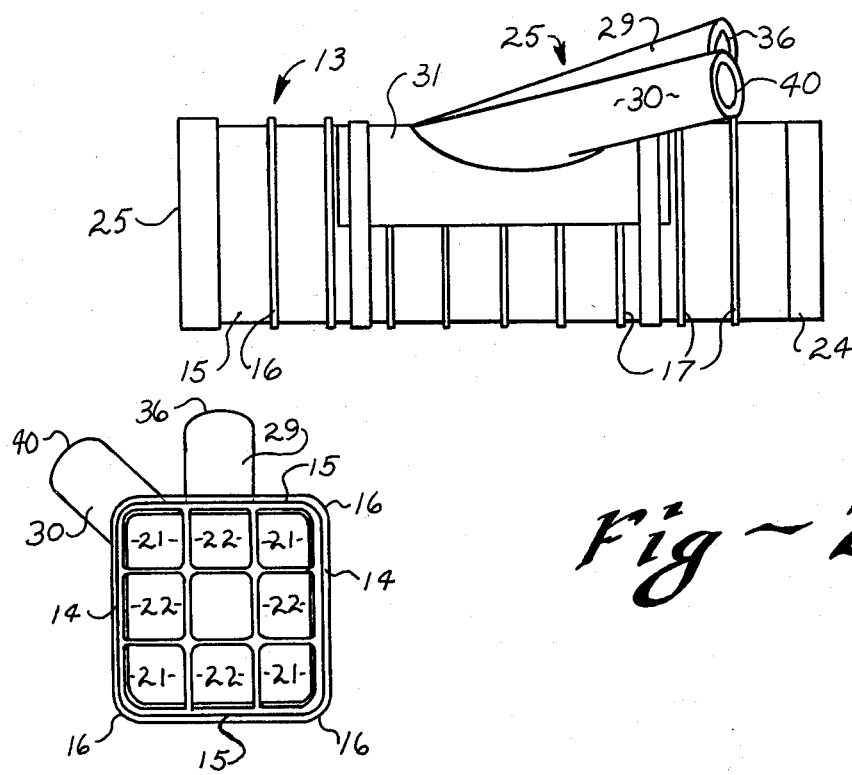
Fig-2
Fig-3
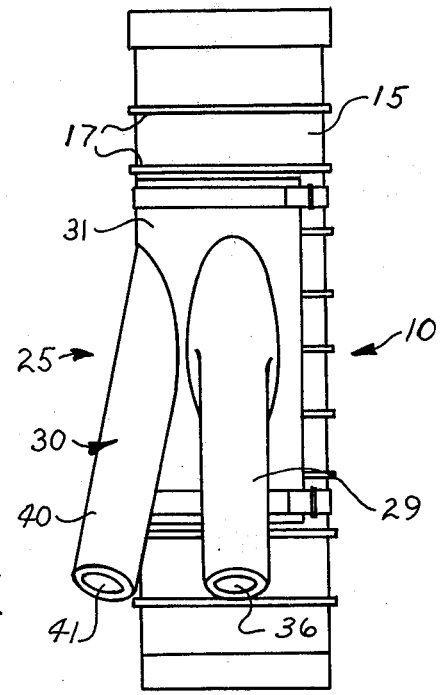
Fig-4

CONNECTOR AND ADAPTER FOR DUCT SYSTEMS FOR TELEPHONE CABLES AND THE LIKE

BACKGROUND OF THE INVENTION

1. Field of the Invention

This invention relates to duct systems for protecting telephone cable and other cable and conductors, and specifically to a connection adapted to facilitate the transfer of such cable from multiple bore conduits to single bore tubular ducts.

2. Description of the Prior Art

Cables and conductors, such as telephone cable, electrical cable, and current-carrying conductors, are often enclosed in protective ducts. These ducts are commonly buried and used for the installation of underground telephone cables. In many instances, a single conduit comprising multiple ducts or bores is used. Examples of early forms of these multiple duct conduits are shown in U.S. Pat. No. 1,785,403, issued to Babb; No. 1,798,205, issued to Jewell; and No. 1,835,245, issued to Shibley.

The earlier forms of these conduits were commonly formed of concrete or similar materials. In recent years, however, a foamed plastic material, such as foamed polyolefin, has been used to form multiple bore conduits. The plastic material is injection-molded to form a conduit section which is typically four feet long and has six or nine separate ducts or bores therein. These sections are then connected end-to-end to form a continuous conduit.

These multiple bore conduits are usually installed with the capability for future system expansion. Such conduits may be installed, for example, when an overhead telephone cable system is converted to an underground system, or when a new street is put in, or when a new development is started. At that time, one or more of the bores in the conduit may be used, and cables will be pulled through these bores. Typically, one or more of the bores will also remain empty to be used when necessary, such as when a new street is developed off a main artery or when a new commercial building is constructed.

A single cable or conductor is commonly encased in a hollow, tubular duct or sheath is formed of a different plastic material. These single bore tubular ducts are usually formed of polyvinyl chloride (PVC) extruded to a nominal four-inch outside diameter and typically supplied in tubular lengths of 20 or 30 feet.

When it becomes necessary to increase the capability of a telephone system, such as to provide service for a new street or building, a new cable or bundle of cables is pulled from the street or building through a single bore PVC duct which leads to the multiple bore conduit. At the point where the duct branches from the conduit, the cable or bundle of cables is then pulled through one of the unoccupied bores of conduit to an adjacent access such as a manhole or the like.

In the use of these two types of ducts, problems have arisen in providing a suitable connection between the multiple bore conduit and the single bore duct. These problems have resulted in part from the incompatible materials used in the conduit and the duct. While both the conduit and the duct are formed of plastic, they are formed of dissimilar plastic materials. The conduit is made of a lightweight, foamed plastic material, whereas the duct is formed of a heavier plastic material, such as PVC. Due to the dissimilarity of the materials, it is impossible to use chemical solvents to seal or "weld" them together, and it has generally not been possible to splice into the underground multiple bore conduit without destroying the conduit.

One solution to this problem has been to install two single bore ducts on top of the multiple bore conduit and to use these ducts for subsequent connection to branch ducts as necessary. However, the installation of the additional ducts on top of the multiple bore conduit results in ineffective use of the bores within the conduits, consumes additional lengths of cable, increases the material cost by requiring excess single bore ducts to be installed, and increases the effort and expense of installing underground conduits, since two additional ducts must be installed at the same time.

SUMMARY OF THE INVENTION

The present invention overcomes the problems and shortcomings of connecting conduits and ducts of the prior art, and provides advantages heretofore not obtainable. The present invention provides a connector or adapter which may be installed between a multiple bore conduit and a single bore duct to provide an interconnection or junction therebetween which maintains the integrity of the duct system. The present invention provides a connection which may be formed of a long-life plastic material and which is especially adapted to be securely attached to the outside of a multiple bore conduit, such as one of those formed of foamed plastic material, and to provide a protective entry to one of the bores of the conduit. The connection of the present invention is also adapted to make a sealing protective attachment with the end of a hollow, tubular, single bore duct, such as one formed of PVC plastic material, wherein the connection is also formed of a plastic material similar to that used in the single bore duct and may be chemically solvent-welded or otherwise sealingly secured to the duct.

The present invention comprises a connection which uses only three different pieces or elements to provide a connection between the single bore duct and any of the outer bores of the multiple bore conduit. One piece is a saddle element which is adapted to fit around the outside of the conduit and to be secured to the conduit by suitable means such as straps or the like. The saddle element is designed to be universal, and may be used for entry into any one of the four corner bores of the conduit or any one of the outer center or middle bores of the conduit. The other pieces of the connection are sleeve elements each of which is adapted to extend from the conduit and to be secured to the conduit by the saddle element. The sleeve element is made in one of two configurations, one for entry into one of the corner bores and one for entry into one of the center or middle bores, and one of these configurations may be used for connection to any of the outer bores of the conduit.

The duct system of the present invention provides a continuous sealed enclosure through which telephone cables or other cables and conductors may be carried in a protective environment. The duct system may be easily and economically installed with a minimum of labor cost, resulting in a significant savings in the expense of underground cable installation. The duct system of the present invention, comprising the multiple bore conduits, the single bore ducts, and the connection therebetween, provides a smooth, continuous interior surface against which the cables may be pulled when the cables are installed which branch from the conduit, and eliminates sharp corners or rough surfaces which make the installation of cables in the ducts more difficult.

These and other advantages are accomplished by the present invention of a duct system for telephone cables, electrical cables, current-carrying conductors, and other cables and conductors which comprises a conduit having therein at least two separate, parallel ducts or bores. Each of the bores may be adapted to contain a cable. The duct system also comprises a hollow, tubular duct branching from the conduit. The hollow, tubular duct may be adapted to contain a single cable branching from the conduit.

As a part of this duct system the present invention provides a connection between the conduit and the tubular duct. The connection is adapted to one end to be attached to the conduit and to communicate with one of the bores of the conduit, and is adapted at the other end to be attached to the end of the duct. The connection comprises a sleeve element having a base portion adapted to fit against the outside of the conduit and a tubular portion extending from the base portion, and a saddle element adapted to fit over the base portion and to be secured to the conduit to attach the connection thereto.

In the preferred form of the invention, the conduit is formed of a foamed plastic material, and the duct is formed of a continuous plastic material, such as polyvinyl chloride (PVC). In this preferred form, the connection is preferably made of a plastic material similar to that of the duct so that the connection may be chemically solvent-welded or otherwise sealingly attached to the end of the duct. The other end of the connection is then strapped or otherwise firmly mechanically attached to the outside of the conduit.

BRIEF DESCRIPTION OF THE DRAWINGS

FIG. 2 is a side elevational view of a portion of the assembled duct system comprising the conduit and the connection.

FIG. 3 is an end view of the portion of the duct system of FIG. 2.

FIG. 4 is a top plan view of the portion of the duct system of FIGS. 2 and 3.

DETAILED DESCRIPTION OF THE PREFERRED EMBODIMENT

Figure 1:
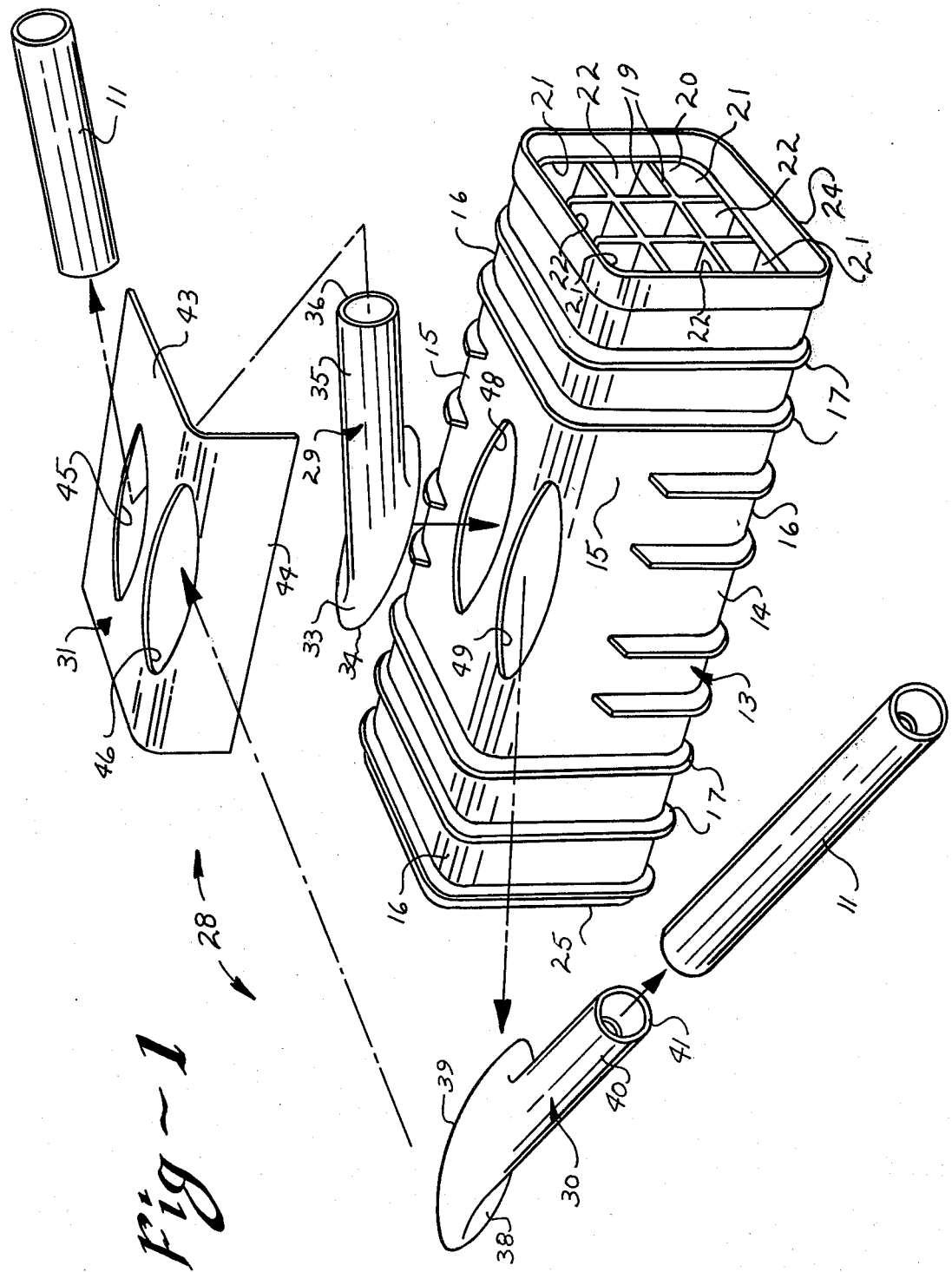
FIG. 1 is a perspective, exploded view of the individual elements of the duct system incorporating the present invention.

Referring more particularly to the drawings, and initially to FIG. 1, there is shown the duct system of the present invention. The duct system includes two known types of ducts or conduits which are used for telephone cables or other cables and conductors. These two types are the multiple bore conduit 10 and the single bore, tubular duct 11.

The multiple bore conduit 10 is of the known type for carrying a plurality of conductors. The conduit 10 is formed in sections 13 (FIG. 1), each approximately four feet long, which may be connected end-to-end to form a continuous conduit for a plurality of cables or conductors, such as telephone cables. Each conduit section 13 has an outer protective shell 14 which may be generally square or rectangular in cross section (FIG. 3), with four flat, planar exterior surfaces 15 extending between four rounded corners 16. The outer shell 14 is reinforced by a plurality of ribs 17 (FIG. 1) which extend circumferentially around the outside of the conduit section 13. Inside the shell 14, each conduit section 13 has inner partitions 19 (FIG. 3) extending horizontally and vertically to divide the conduit into a plurality of separate ducts or bores 20. A separate cable or conductor may be provided in each of the bores 20. In the form of the invention shown in FIGS. 1 and 3, nine bores 20 are shown. Four of the bores 20 are at the corners of the conduit and may be designated corner bores 21, and four of the bores are between the corner bores 21 and may be designated middle bores 22. Other alternative forms of conduits may contain a total of, for example, six bores, or more or fewer bores.

The conduit sections 13 are connected together by providing connector portions at each end of the conduit section. Each section 13 is molded into a bell configuration at one end 24 and a spigot on the other end 25. The bell end 24 of one conduit section is adapted to fit over and connect with the spigot end 25 of the next adjacent conduit section. A plastic gasket may be placed on the spigot end 25 to provide a flexible but tight seal when the spigot end 25 is inserted into the bell end 24 of the adjacent section.

Such conduit sections 13 have previously been made of a number of materials, including concrete, fiber, fiber cement, iron pipe, and vitrified clay. The preferred conduit sections 13 of the present invention are, however, formed of a lightweight foamed plastic material, such as polyolefin. This lightweight plastic material allows the conduit sections 13 to be easily handled during installation without special handling equipment. In addition, the plastic material by itself provides a suitable seal between the conduit sections eliminating the need for a separate gasket.

The multiple bore conduits 10 are used in installations in which it is necessary to run more than one cable or conductor. The conduits 10 are installed by digging a trench, assembling the conduit sections 13 in place in the trench, and then burying the conduit. The cable or conductor is then pulled through the assembled buried conduit.

Figure 5:
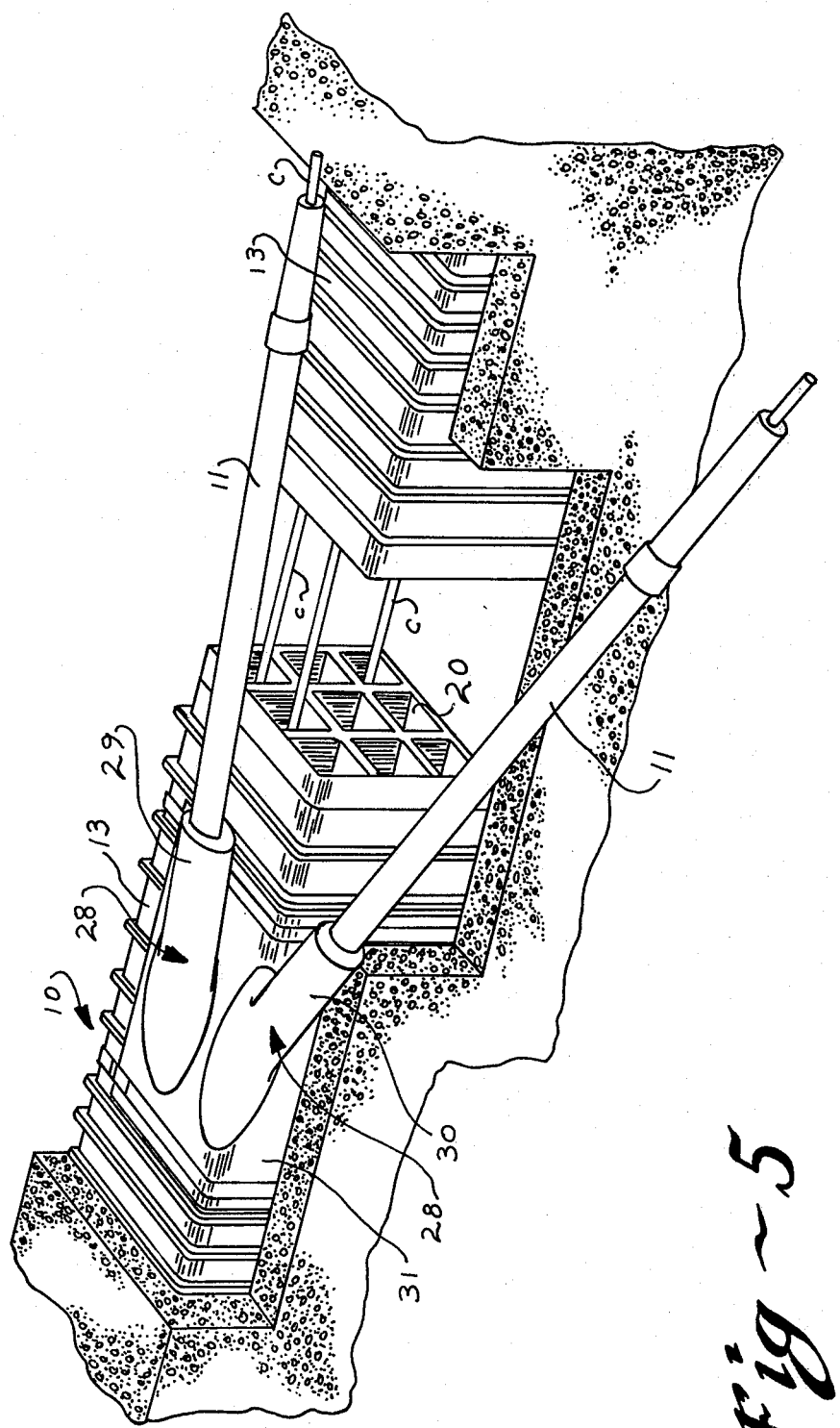
FIG. 5 is a perspective view showing the assembled duct system installed in the ground, with portions of the system uncovered or removed for clarity.

In other situations in which a single cable or conductor or a single bundle of cables is installed and the multiple bore conduit 10 is impractical, the single bore plastic duct or sheath 11 is used. Portions of the ducts 11 are shown in FIG. 1, and a more extensive length of a duct 11 is shown in FIG. 5. The tubular duct 11 is formed of a protective plastic material, such as polyvinyl chloride (PVC) or the like. The duct 11 is formed by extruding PVC in a tubular size having a diameter of about four inches. The duct 11 is supplied in 20- to 30- foot lengths, and is sealed together into a continuous duct to contain a single cable or conductor.

The present invention provides a connection between the multiple bore conduit 10 and the single bore tubular duct 11, so that a duct 11 may be used for cables or conductors which branch from the conduit 10. A sealing protective transition is made between the conduit 10 and the duct 11 by the connection 28 of the present invention. The connection 28 comprises a sleeve element 29 or 30 and a saddle element 31 (FIG. 1).

The sleeve elements 29 and 30 are slightly different, and will be described separately. The sleeve element 29 is formed of a molded plastic material with a base portion 33 having a generally flat end surface 34 adapted to fit snugly against one of the flat exterior surfaces of the conduit section 13. Extending from the base portion 33 is a tubular portion 35 which is generally similar in diameter and thickness to the tubular duct 11. At the end 36 of the tubular portion 35 opposite the end surface 34, the saddle element 31 is adapted to be connected to the end of a portion of the duct 11. The other sleeve element 30 is identical in material and construction to the sleeve element 29, except for the design of its base portion 38. The base portion 38 has a curved end surface 39 adapted to fit snugly against one of the exterior corners 16 of the conduit section 13. Extending from the base portion 38 is a tubular portion 40 generally similar to the tubular portion 35 of the sleeve element 29, and having an end 41 opposite the end surface 39, which is adapted to be connected to the end of a portion of the tubular duct 11.

The connection 28 also comprises a saddle element 31 which is formed of a plastic sheet material contoured to conform to the exterior surfaces of the conduit section 13 and having a planar portion 43 adapted to fit over any one of the flat exterior surfaces 15 of the conduit section 13 and having a curved portion 44 adapted to fit along the ridge of any one of the corners 16 of the conduit section. The saddle element 31 contains two openings 45 and 46, each of which is generally oval in shape. The opening 45 is formed in the planar portion 43 of the saddle element 31, and is specially adapted to fit around the end of the tubular portion 35 of the sleeve element 29 at the junction between the tubular portion 35 and the base portion 33. The opening 46 extends along the curved portion 44 of the saddle element 31, and is specially adapted to fit around the tubular portion 40 of the sleeve element 30 at the junction between the tubular portion 40 and the base portion 38. Thus, the same saddle element 31 may be used with either sleeve element 29 or sleeve element 30, or both, and may be used on any of the exterior surfaces 15 and exterior corners 16 of the conduit. In addition, the same saddle element 31 may be used whether the sleeve element 29 or 30 extends in either direction from the conduit, since the opening 45 and 46 are adapted to accommodate the sleeve elements extending in either direction. Thus, the single saddle element 31 has universal application.

The connection 28 is used to provide a sealing connection between the multiple bore conduit 10 and a branching, single bore tubular duct 11. During the installation of the connection 28, the trench in which the multiple bore conduit 10 is buried is reopened, and a hole 48 or 49 (FIG. 1) is cut in one of the conduit sections 13 by the installer. The saddle element 31 may be used as a template so that the installer may accurately scribe the location and size of the desired opening in the conduit section 13. The opening 48 or 49 provides access to one of the bores 20 of the conduit. After cutting the opening, one of the sleeve elements 29 or 30 is placed over the opening, depending upon whether it is the opening 49 for one of the corner bores 21 of the conduit or the opening 48 for one of the middle bores 22. The sleeve element 29 or 30 thus communicates with one of the bores 20 of the conduit. The saddle element 31 is then placed over the sleeve element 29 or 30, with the tubular portion 35 or 40 extending through one of the openings 45 or 46, and the saddle element 31 is positioned until it securely holds the base portion 33 or 38 of the sleeve element. The saddle element 31 is then firmly attached to the conduit section 13 with tape, wire, or banding, or by other mechanical means. The resulting assembly resembles that shown in FIGS. 2–4. The outer end 36 or 41 of the sleeve element is then chemically solvent-welded to the end of a new tubular duct 11, resulting in the construction shown in FIG. 5. After the connection has been made, the entire area may be encased in a concrete envelope, as is well known in the art. Thereafter, a conductor or cable C may be pulled through the branching, tubular duct 11, through the connection 28, and through one of the bores 20 in the conduit 10. The cable or conductor C may be pulled through the duct system, using any suitable method known in the art. Since the connection 28 provides a sealed protective path which avoids sharp branching angles, the duct system is especially suitable for using air-propelled feed systems, such as those using "parachutes" and the like.

It can be seen that either or both of the sleeve elements 29 and 30 may be used to tap into the multiple bore conduit 10. The sleeve element 29 is used to provide a connection with any of the four center or middle bores 22 in the nine-bore conduit 10, while the sleeve element 30 is used to provide a connection between any of the four corner bores 21 in the conduit. A single saddle element 31 having a pair of openings 45 and 46 may be used for either of the sleeve elements 29 or 30 extending in either direction. In addition, it is possible at a single connection point to provide a connection between one or more of the middle bores 22 by using a sleeve element 29 and one or more of the corner bores 21 by using a sleeve element 30, with one or more of the saddle elements 31.

Various modifications may be made to the preferred form of the invention. For example, multiple bore conduits having more or fewer bores 20 may be used. Materials other than the preferred plastics used in the duct system just described may be used, although a foamed plastic material is preferred for the multiple bore conduit 10, and PVC is preferred for the connection 28 in the single bore, tubular duct 11. Other modifications and changes are, of course, possible.

While the invention has been shown and described with respect to specific embodiments thereof, these are intended for the purposes of illustration rather than limitation, and other modifications and variations in the specific form of the invention herein shown and described will be apparent to those skilled in the art, all within the intended scope and spirit of the invention. Accordingly, the invention is not to be limited to the specific embodiments herein shown and described, nor in any other way which is inconsistent with the extent to which the progress in the art has been advanced by this invention.

What is claimed is:

1. A duct system for telephone cables, electrical cables, current-carrying conductors, and other cables and conductors, which comprises:

a conduit of generally rectangular cross section having generally flat exterior surfaces connected by rounded corner exterior surfaces and having therein at least two separate, parallel bores;

a hollow, tubular duct branching from the conduit; and a connection adapted to one end to be attached to the conduit and to communicate with one of the bores of the conduit and adapted at the other end to be attached to the end of the duct, the connection comprising a sleeve element having a base portion adapted to fit against the outside of the conduit and a tubular portion extending from the base portion, and a saddle element, the saddle element comprising a planar portion adapted to fit against a flat exterior surface of the conduit, and a curved portion adapted to fit against a rounded corner exterior surface of the conduit, the saddle element having at least two openings therethrough, each of which will fit over the sleeve element, one of the openings in the curved portion of the saddle element, and another of the openings in the planar portion of the saddle element, the saddle element adapted to be secured to the conduit to attach the connection thereto.

2. A duct system as in claim 1, wherein the duct and the connection are both formed of a plastic material and the end of the connection is sealed to an end of the duct.

3. A duct system as in claim 2, wherein the end of the connection is chemically welded to the duct.

4. A duct system as in claim 2, wherein the duct and the connection are both formed of polyvinyl chloride.

5. A duct system as in claim 1, wherein the conduit is formed of a foamed plastic material.

6. A duct system as in claim 1, wherein the base portion of the sleeve element has a flat end surface adapted to fit against a flat exterior surface of the conduit.

7. A duct system as in claim 1, wherein the saddle element of the connection is strapped to the outside of the conduit.

8. A duct system for telephone cables, electrical cables, current-carrying conductors, and other cables and conductors, which comprises:

a conduit which is generally rectangular in cross section with corner exterior surfaces and which has therein at least two separate, parallel bores;

a hollow, tubular duct branching from the conduit; and a connection adapted at one end to be attached to the conduit and to communicate with one of the bores of the conduit and adapted to the other end to be attached to the end of the duct, the connection comprising a sleeve element having a base portion with a curved end surface adapted to fit against a corner exterior surface of the conduit and a tubular portion extending from the base portion, and a saddle element adapted to fit over the base portion and to be secured to the conduit to attach the connction thereto.

9. In combination with a conduit of generally rectangular cross section having generally flat exterior surfaces connected by rounded corner exterior surfaces and having at least two separate bores therein, each bore adapted to contain at least one cable or conductor; and a hollow, tubular duct adapted to contain at least one cable or conductor; a connector adapted at one end to be attached to the conduit and to communicate with one of the bores of the conduit and adapted at the other end to be attached to the said tubular duct, the connector comprising a sleeve element having a base portion adapted to fit against the outside of the conduit, said sleeve element having a tubular portion extending from the base portion; and a saddle element comprising a planar portion adapted to fit against a flat exterior surface of the conduit, and a curved portion adapted to fit against a rounded corner exterior surface of the conduit, the saddle element having at least two openings therethrough each of which will fit over the sleeve element, one of the openings in the curved portion of the saddle element, and another of the openings in the planar portion of the saddle element; the saddle element adapted to be secured to the conduit to attach the connector thereto.

10. The combination of claim 9, wherein the connection is formed of a plastic material and is adapted to be sealed to an end of the duct.

11. The combination of claim 10, wherein the end of the connection is adapted to be chemically welded to the duct.

12. The combination of claim 10, wherein the connection is formed of polyvinyl chloride.

13. The combination of the claim 9, wherein the base portion of the sleeve element has a flat end surface adapted to fit against a flat exterior surface of the conduit.

14. The combination of claim 9, wherein the saddle element of the connection is strapped to the outside of the conduit.

15. In combination with a conduit having at least two separate bores therein, each bore adapted to contain a cable or conductor, the conduit being generally rectangular in cross section with corner exterior surfaces, and a hollow, tubular duct branching from the conduit and adapted to contain a cable or conductor, a connection adapted at one end to be attached to the conduit and to communicate with one of the bores of the conduit and adapted at the other end to be attached to the end of the duct, the connction comprising a sleeve element having a base portion with a curved end surface adapted to fit against a corner exterior surface of the conduit, and a saddle element adapted to fit over the base portion and to be secured to the conduit to attach the connection thereto.

* * * * *